United States Patent [19]

Pyo

[11] Patent Number: 5,896,020
[45] Date of Patent: Apr. 20, 1999

[54] DRIVING CIRCUIT FOR A SWITCHED RELUCTANCE MOTOR

[75] Inventor: Sang-Yeon Pyo, Yongin, Rep. of Korea

[73] Assignee: Samsung Electronics Co., Ltd., Suwon, Rep. of Korea

[21] Appl. No.: 08/866,079

[22] Filed: May 30, 1997

[30] Foreign Application Priority Data

Jun. 28, 1996 [KR] Rep. of Korea ............. 96-18546

[51] Int. Cl.$^6$ ...................................... H02P 5/05
[52] U.S. Cl. ............................. 318/701; 318/254
[58] Field of Search ......................... 318/696, 685, 318/254, 439, 138, 701

[56] References Cited

U.S. PATENT DOCUMENTS

| | | | |
|---|---|---|---|
| 5,319,291 | 6/1994 | Ramirez | 318/254 |
| 5,343,382 | 8/1994 | Hale et al. | 363/98 |
| 5,589,752 | 12/1996 | Iwasaki et al. | 318/701 |

*Primary Examiner*—Brian Sircus
*Attorney, Agent, or Firm*—Larson & Taylor

[57] ABSTRACT

This invention provides a driving circuit for a switched reluctance motor(SRM) comprising a current sensing unit which senses current amount flowing into a driving circuit of the SRM and outputs a signal representing current amount flowing in the driving circuit, a comparing unit which compares a reference current amount with current amount flowing in the driving circuit in response to the output signal from the current sensing means, and outputs a stop signal in case the current amount flowing in the driving circuit of the SRM exceeds the reference current amount, and a signal selecting unit which receives output signal from the comparing means, a Pulse Width Modulated(PWM) signal and a rotor position signal, and outputs a gate controlling signal for turning off the switching element during an input of the stop signal from the comparing means. The protection of the driving circuit against the excess current according to the present invention improves reliability of the SRM, as well as eliminates the ripple component in the driving current (torque ripple) generated at the time of an initial start-up of each phase, which reduces loud noise of the motor.

1 Claim, 8 Drawing Sheets

DRIVING CIRCUIT FOR A SWITCHED RELUCTANCE MOTOR

BACKGROUND OF THE INVENTION

1. Field of the Invention

The present invention relates to a switched reluctance motor(SRM), and more particularly to a driving control apparatus for the SRM for preventing an excessive driving current from flowing into the SRM.

2. Description of the Prior Art

In general, a switched reluctance motor(SRM) includes, as shown in FIG. 1, a stator 2 and a rotor 4, wherein the stator 2 has three pairs of poles +A and −A, +B and −B, and +C and −C(or, salient pole C) on which A phase coil 6, B phase coil 8, and C phase coil 10 are wound, respectively.

A driver for the SRM thus constructed consists of, as shown in FIG. 2, a smoothing capacitor C for producing a direct current voltage, a plurality of switching elements Q1 to Q6 for applying the voltage to the respective phase coils 6, 8, and 10, 6 diodes D1 to D6 for feedback of a back electromotive force created at the time of turning-off of the respective switching elements Q1 to Q6 after applying the voltage to each said phase coil.

The switching operation of the A-phase switching elements Q1 and Q2 may be controlled by a signal produced from a gate signal generating unit. This unit includes, as shown in FIG. 3, an oscillator 12 which outputs a Pulse Width Modulated(PWM) signal, an AND logic gate 16 which produces a logic product of said produced PWM signal and a position information signal available from an A phase position sensor 14 when the rotor 4 faces with A phase pole of the stator 2, wherein the signal from the AND logic gate 16 is applied to an upper A phase switching element Q1, and wherein the position information signal from the A phase position sensor 14 is applied to a lower A phase switching element Q2.

An application of a power to the A phase of the SRM may be made by giving operational signals to the gate of A phase-related switching elements Q1, Q2. The activated switching elements Q1, Q2 allow electric current to flow through the A phase coil of the stator 2, resulting in magnetization of the poles +A and −A of the stator. Such magnetized poles pull the rotor 4 positioned near the A phase pole.

B and C phase coils 8 and 10 also operate as in A phase-related action, similarly, wherein the order of A, B and C phase for the magnetization of the stator 2 is maintained, by which the motor can continue to rotate.

However, reliability of the SRM conventionally used cannot be guaranteed when abnormal operation and surge current occur to the driver, to further render the efficiency of the motor to become lower. Moreover, there is a problem in that loud noise from the motor is generated due to current ripple, or torque ripple phenomenon at an initial start-up at each phase.

FIG. 4 shows a schematic block diagram of a driver for a variable reluctance motor, or SRM disclosed in U.S. Pat. No. 5,225,758, where the driver controls the motor in such a manner that an average voltage linearly varies which is to be supplied to the coil for a current deviation or current command. For this, the driver has an absolute value circuit 20, a PWM circuit 21, a polarity determining circuit 12, a signal selection circuit 23, first and second drivers 24a, 24b, an On/Off signal generator 30, and a driving circuit 40.

The absolute value circuit 20 receives both a current command from a host computer and a current deviation for a current in reality, compares them with a carrier signal, produces an output representing an absolute value for the current deviation, and outputs it to the PWM circuit 21, wherein the PWM circuit 21 compares the absolute value for the current deviation with the carrier signal to obtain a PWM signal, and then outputs it to the signal selection circuit 23.

In case the current deviation is above 0 volt, the polarity determining circuit 12 outputs a low level signal to turn on a first transistor Q1 in the driving circuit 40. During high level of the output signal from the On/Off signal generator 30, a second transistor Q2 is turned on/off depending upon the PWM signal output from the PWM circuit 21.

In case the current deviation is below 0 volt, the second transistor Q2 is turned off by the signal selection circuit 23, and the first transistor Q1 is turned on/off by the PWM signal.

As a result, the average coil voltage linearly varies with respect to the current deviation, or the current command, by which the control for the motor can readily be made.

The above driver for the SRM determines a duty ratio for the PWM in response to the current deviation or the current command, and selects and operates switching element for applying the PWM based upon the polarity of the current deviation, so as to result in a linear variation of the average coil voltage with respect to the current deviation or the current command.

SUMMARY OF THE INVENTION

Therefore, it is an object of the present invention to provide a driver for a switched reluctance motor(SRM) by which the reliability for the SRM can further be improved through the protection of the driver against a surge current.

Another object according to the present invention is to provide a driver for the SRM which can reduce loud noise from the motor by eliminating ripple (torque) components in the driving current at an initial start-up for each phase of the motor.

The above objects are accomplished by a driving circuit for a switched reluctance motor(SRM), the circuit having a plurality of switching elements operated in response to gate signals input from an external, for applying or cutting off a direct voltage to each phase coil, the circuit comprising:

current sensing means which senses current amount flowing into a driving circuit of the SRM and outputs a signal representing current amount flowing in the driving circuit;

comparing means which compares a reference current amount with current amount flowing in the driving circuit in response to the output signal from the current sensing means, and outputs a stop signal in case the current amount flowing in the driving circuit of the SRM exceeds the reference current amount; and signal selecting means which receives output signals from the comparing means, a Pulse Width Modulated(PWM) signal and a rotor position signal, and outputs a gate controlling signal for turning off the switching element during an input of the stop signal from the comparing means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

The preferred embodiment according to the present invention will now be described in detail in accordance with the accompanying drawings.

Figure 1:
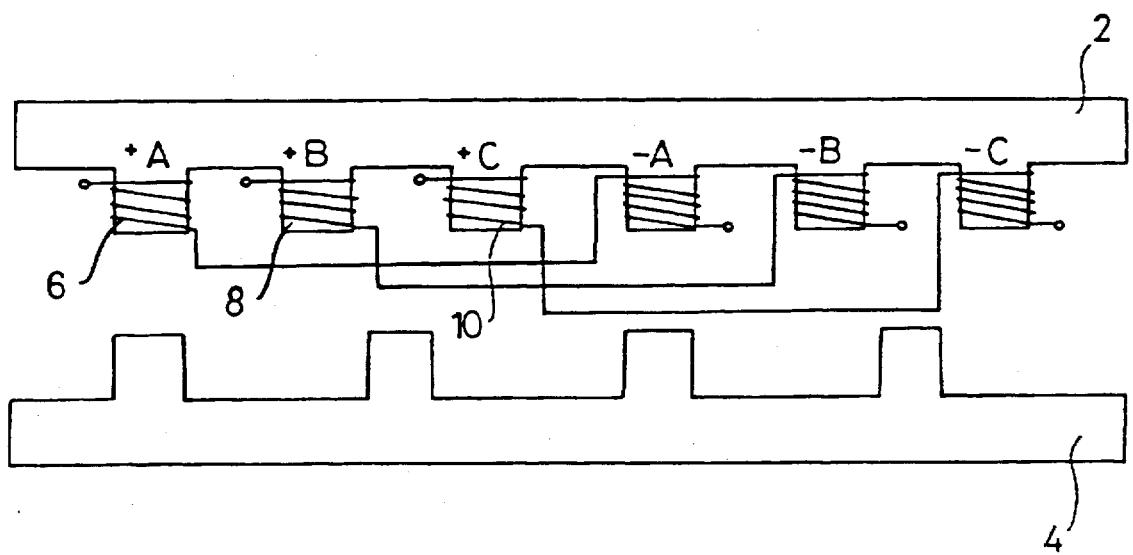
FIG. 1 schematically shows a construction of a conventional switched reluctance motor(SRM)
Figure 2:
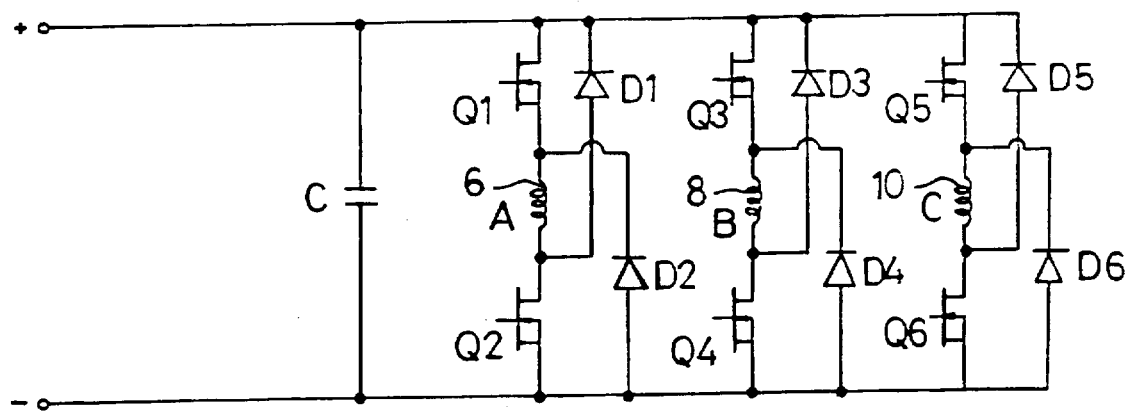
FIG. 2 shows a detailed conventional circuit diagram for driving the SRM.
Figure 3:
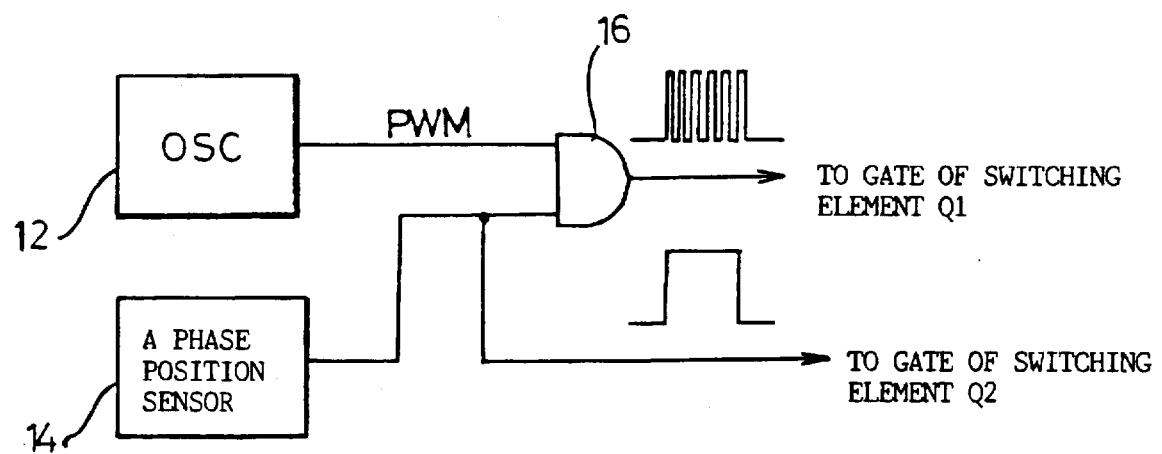
FIG. 3 shows a schematic gate controlling circuit for switching elements in FIG. 2.
Figure 4:
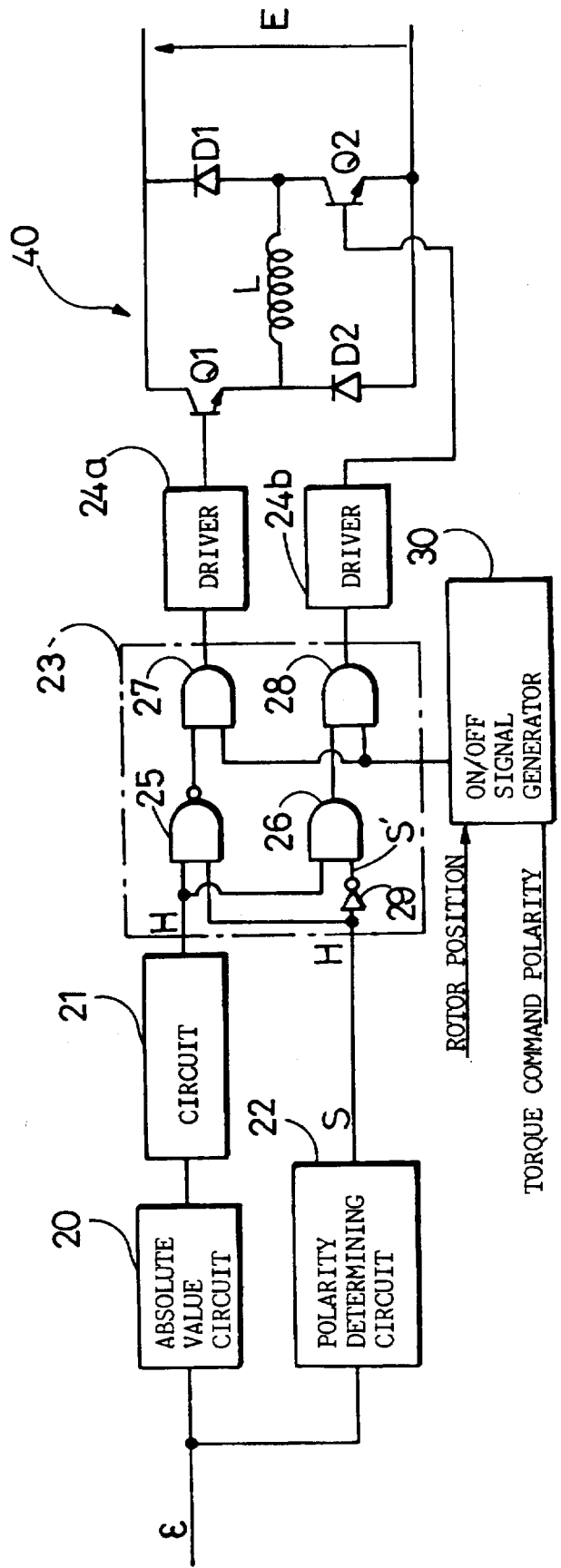
FIG. 4 shows a schematic block diagram of a driver for a variable reluctance motor disclosed in U.S. Pat. No. 5,225,758.
Figure 5:
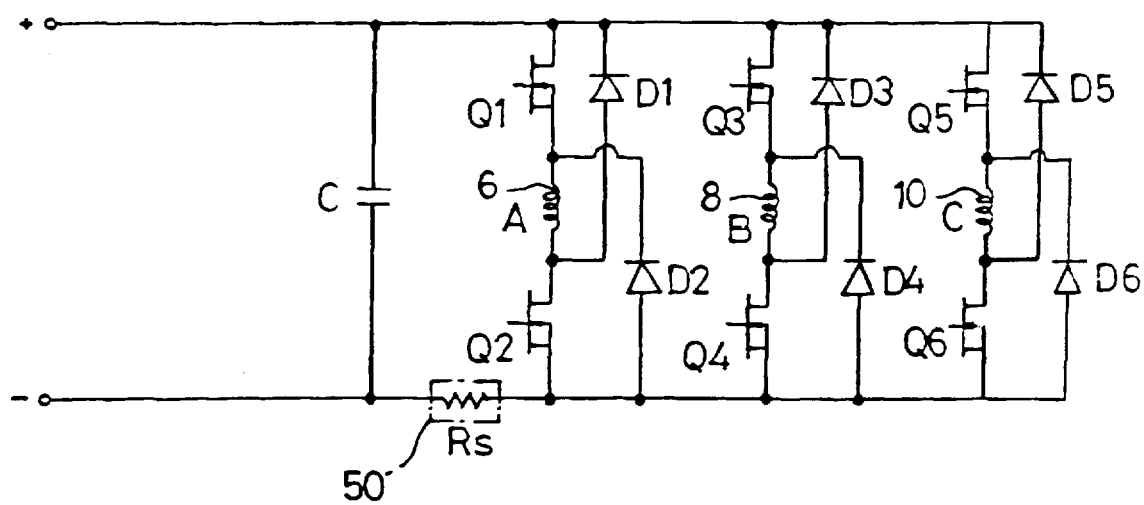
FIG. 5 shows a driving circuit for the SRM in accordance with the present invention.

FIG. 5 is a driving circuit for a switched reluctance motor(SRM) in accordance with the present invention, the circuit including a smoothing capacitor C for producing a direct voltage, a plurality of switching elements Q1 to Q6 for applying the voltage to the respective phase coils 6, 8, and 10, 6 diodes D1 to D6 for feedback of a back electromotive force created at the time of turning-off of the respective switching elements Q1 to Q6 after applying the voltage to each said phase coil, and a resistor Rs which serves to sense electric current flowing through the switching elements Q1 to Q6 and output a voltage proportionally corresponding to the sensed current amount.

Figure 6:
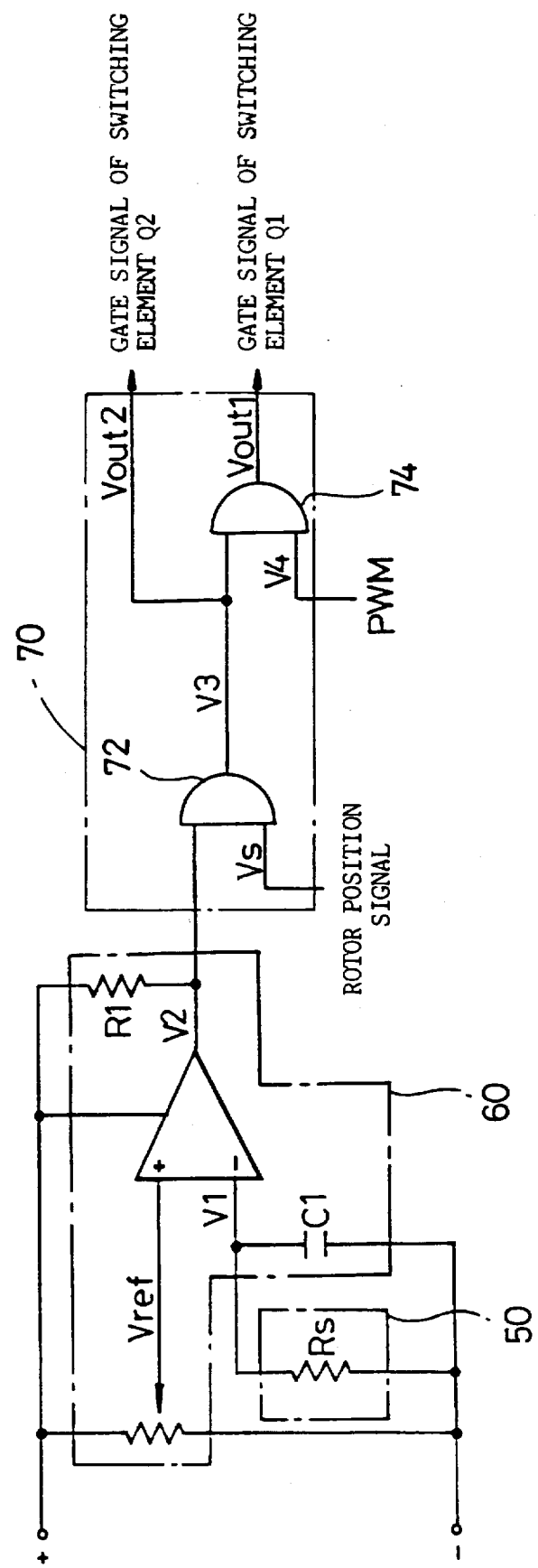
FIG. 6 shows a circuit of a driving control apparatus designed to drive the SRM in accordance with the present invention.

FIG. 6 is a circuit diagram of a driving control apparatus designed to drive the SRM in accordance with the present invention, especially in case of controlling gates of the switching elements Q1, Q2 which are operated to apply or cut off the voltage to the A-phase coil 6.

The driving control apparatus for the SRM according to the present invention as shown in FIG. 6 consists of current sensing means 50 which senses current amount flowing into a driving circuit of the SRM and outputs a signal representing current amount flowing in the driving circuit, comparing means 60 which compares a reference current amount with current amount flowing in the driving circuit in response to the output signal from the current sensing means 50, and outputs a stop signal in case the current amount flowing in the driving circuit of the SRM exceeds the reference current amount, and signal selecting means 70 which receives output signal from the comparing means 60, a Pulse Width Modulated(PWM) signal and a rotor position signal, and outputs a gate controlling signal for turning off the switching element during an input of the stop signal from the comparing means 60.

The current sensing means 50 has a current sensing resistor Rs coupled to minus(−) terminal of the driving circuit for the SRM, which serves to output a voltage signal proportional to a driving current value.

The comparing means 60 consists of a variable resistor VR for determining a reference voltage Vref, a capacitor C1 for eliminating noise components contained in the voltage signal output from the current sensing resistor Rs, and an OP-amp which outputs a low level signal when a voltage value of a voltage signal applied through the capacitor C1 is larger than that of the reference voltage Vref, and outputs a high level signal when a voltage value of a voltage signal applied through the capacitor C1 is smaller than that of the reference voltage Vref.

The signal selecting means 70 consists of a first logic product gate 72 which performs logic product of the output signal from the comparing means 60 and the rotor position signal and then produces a signal for controlling the gate of the upper switching element Q1, and a second logic product gate 74 which performs logic product of the output signal from the first logic product gate 72 and the PWM signal and then produces a signal for controlling the gate of the upper switching element Q2.

Reference symbol R1 denotes a bias resistor.

The operation and effect of the driving control apparatus for the SRM according to the present invention thus constructed will be described with reference to FIGS. 5 to 8.

A direct voltage is applied to A-, B- and C-phase coils 6, 8, 10 of the driving circuit for the SRM through the identical voltage application procedures.

For the purpose of applying electric power to the A-phase coil 6 of the SRM, if an operation signal is provided to the gates of the switching elements Q1, Q2, electric current flows into the A-phase coil 6 of the stator, so that the poles +A and −A of the stator is magnetized. The pole of the magnetized A-phase generates a force for attracting nearby rotor, which causes the rotation of the rotor.

Similarly, the above procedures are also applied to B- and C-phase coils 8 and 10. Then, the stators of A-, B-, and C-phases are sequentially magnetized in the above-mentioned order, resulting in the continued rotation of the SRM.

At this time, when A phase-related switching elements Q1 and Q2 are off, and B phase-related switching element is on, a voltage remaining in the A phase coil charges the capacitor C through the diode D2, A phase coil 6 and then diode D1, in which the charged voltage is afterward utilized during the subsequent operation. This action improves the efficiency of the motor.

The current sensing resistor Rs connected to minus terminal of the driving circuit senses electric current flowing into the driving circuit and outputs a voltage signal whose level is determined by a well-known fundamental equation, V=IR.

Figure 7:
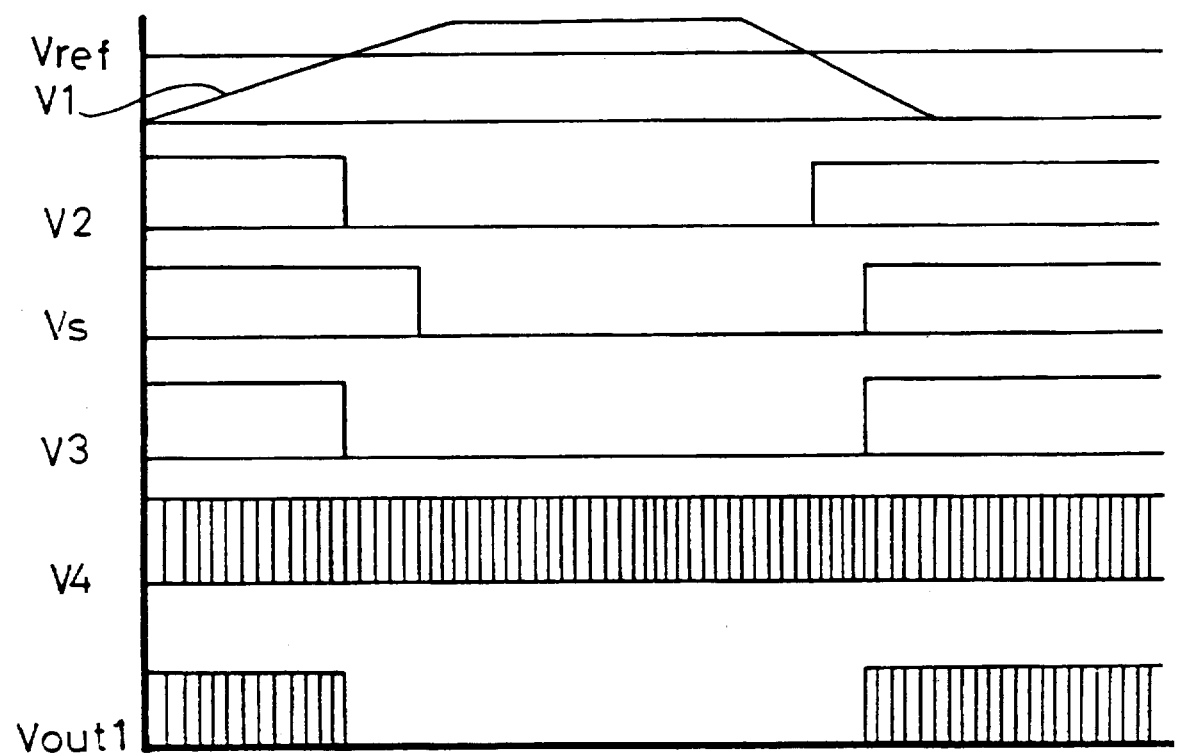
FIG. 7 shows waveforms of various parts in FIG. 6.

As shown in FIG. 7, in case a voltage value V1 of the voltage signal from the current sensing resistor Rs exceeds the reference voltage Vref produced from the variable resistor VR, the OP-amp outputs a low level signal.

The voltage V2 output from the OP-amp is input to the first logic product gate 72 which also receives the rotor position signal Vs. The logic product result is supplied to the gate of the switching element Q2. Also, the PWM signal V4 for changing the speed is input to the second logic product gate 74 which also receives the output signal V3 from the first logic product gate 72. The logic product result is supplied to the gate of the switching element Q1.

Accordingly, during an output of the low level from the OP-amp, the gate signals for the switching elements Q1, Q2 are not output regardless of the rotor position signal Vs, so that the driving circuit maintains the pause state.

Figure 8:
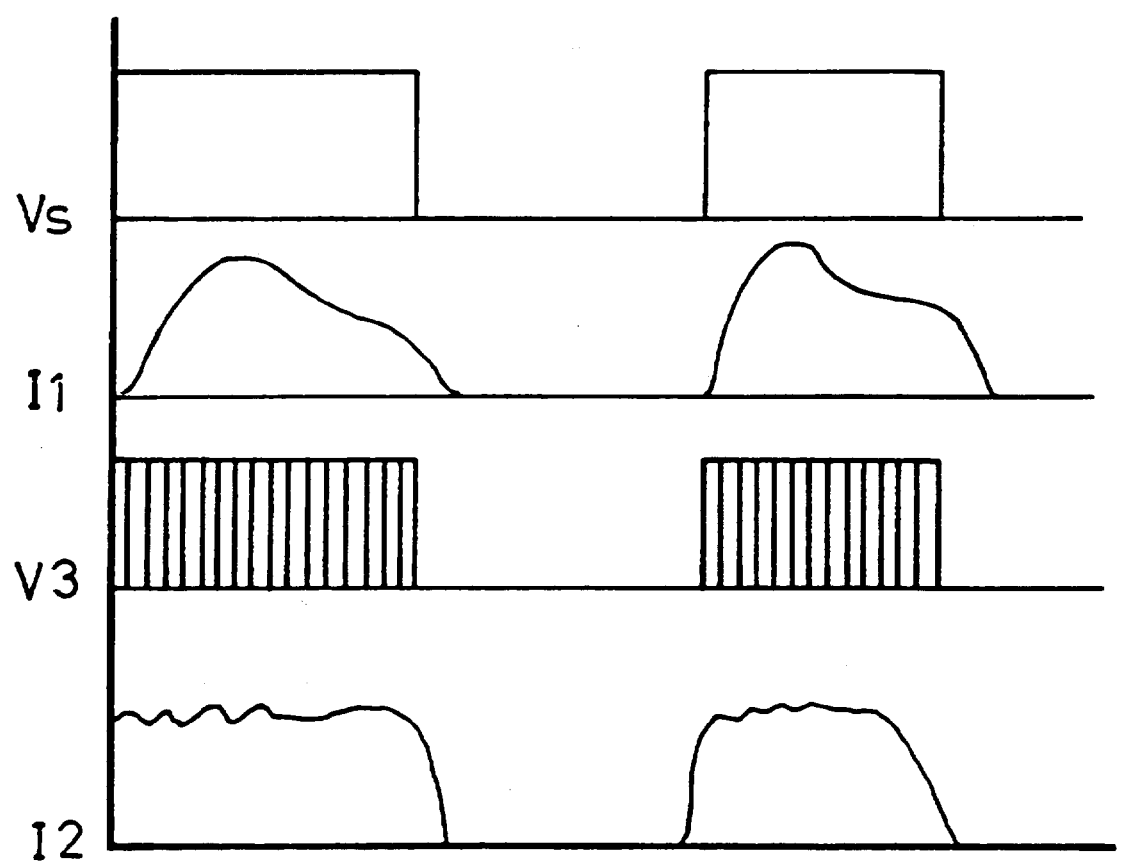
FIG. 8 shows electric current waveform after electric current control.

In FIG. 8, there are shown peak currents I1 and I2 sensed at the start-up of each phase, the former I1 being not subjected to the current control, and the latter I2 being when the current control is made according to the present invention. Since the smoothing of the initial peak current also results in an effect of eliminating the torque ripple, the torque ripple of the motor can be reduced.

According to the present invention, the protection of the driving circuit against the excess current improves the reliability of the SRM, as well as eliminates the ripple component in the driving current(torque ripple) generated at the time of an initial start-up of each phase, which reduces loud noise of the motor.

What is claimed is:

1. A driving circuit for a switched reluctance motor having a plurality of phase coils, the driving circuit having a plurality of switching elements, operated in response to gate signals input from an external source, for applying a direct voltage to or cutting off a direct voltage from each of said phase coils, said driving circuit comprising:

current sensing means which senses current amount flowing in a driving circuit of said motor and outputs a signal representing said current amount flowing in the driving circuit;

comparing means for comparing a reference current amount with said current amount flowing in the driving circuit in response to the output signal from the current sensing means, and for outputting a stop signal when the current amount flowing in the driving circuit of said motor exceeds the reference current amount; and signal selecting means for receiving output signals from the comparing means, a pulse width modulated signal and a rotor position signal, and for outputting a gate controlling signal for turning off the switching element during an input of the stop signal from the comparing means;

said current sensing means comprising a current sensing resistor, coupled to said driving circuit, for outputting a voltage signal proportional to a driving current value;

said comparing means comprising a variable resistor for determining a reference voltage, a capacitor for eliminating noise components contained in the voltage signal produced by the current sensing resistor, and an operational amplifier which outputs a low level signal when a voltage signal applied through the capacitor has a value larger than that of the reference voltage, and which outputs a high level signal when a voltage signal applied through the capacitor has a value smaller than that of the reference voltage; and said signal selecting means comprising a first logic product gate which performs a logic product of the output signal from the comparing means and the rotor position signal and then produces a signal for controlling the gate of one of the switching elements, and a second logic product gate which performs a logic product of the output signal from the first logic product gate and the pulse width modulated signal and then produces a signal for controlling the gate of a further one the switching elements.

* * * * *